(12) United States Patent
Kong et al.

(10) Patent No.: US 9,593,184 B2
(45) Date of Patent: Mar. 14, 2017

(54) OXALIC ACID DIAMIDES AS MODIFIERS FOR POLYOLEFIN CATALYSTS

(71) Applicant: Formosa Plastics Corporation, USA, Livingston, NJ (US)

(72) Inventors: Gapgoung Kong, Sugarland, TX (US); Lei Zhang, Port Lavaca, TX (US); Sun Chueh Kao, Pearland, TX (US); Chih-Jian Chen, Port Lavaca, TX (US)

(73) Assignee: Formosa Plastics Corporation, USA, Livingston, NJ (US)

( * ) Notice: Subject to any disclaimer, the term of this patent is extended or adjusted under 35 U.S.C. 154(b) by 295 days.

(21) Appl. No.: 14/526,166

(22) Filed: Oct. 28, 2014

(65) Prior Publication Data

US 2016/0115260 A1   Apr. 28, 2016

(51) Int. Cl.
C08F 110/06   (2006.01)

(52) U.S. Cl.
CPC ........ *C08F 110/06* (2013.01); *C08F 2410/01* (2013.01)

(58) Field of Classification Search
CPC .................................................... C08F 110/06
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata et al. |
| 4,226,963 A | 10/1980 | Giannini et al. |
| 4,294,721 A | 10/1981 | Cecchin et al. |
| 4,315,835 A | 2/1982 | Scata et al. |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,816,433 A | 3/1989 | Terano et al. |
| 4,978,648 A | 12/1990 | Barbe et al. |
| 5,045,577 A | 9/1991 | Mulhaupt et al. |
| 5,106,807 A | 4/1992 | Morini et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,902,765 A | 5/1999 | Takahashi et al. |
| 5,948,872 A | 9/1999 | Kioka et al. |
| 6,048,818 A | 4/2000 | Morini et al. |
| 6,121,483 A | 9/2000 | Fushimi et al. |
| 6,228,961 B1 | 5/2001 | Grison et al. |
| 6,281,301 B1 | 8/2001 | Morini et al. |
| 6,294,497 B1 | 9/2001 | Morini et al. |
| 6,313,238 B1 | 11/2001 | Morini et al. |
| 6,323,150 B1 | 11/2001 | Kojoh et al. |
| 6,362,124 B1 | 3/2002 | Kuribayashi et al. |
| 6,395,670 B1 | 5/2002 | Morini et al. |
| 6,436,864 B1 | 8/2002 | Tagge |
| 6,552,136 B1 | 4/2003 | Ota et al. |
| 6,605,562 B1 | 8/2003 | Morini et al. |
| 6,689,849 B1 | 2/2004 | Sadashima et al. |
| 6,716,939 B2 | 4/2004 | Morini et al. |
| 6,770,586 B2 | 8/2004 | Tashino et al. |
| 6,818,583 B1 | 11/2004 | Morini et al. |
| 6,825,309 B2 | 11/2004 | Morini et al. |
| 7,009,015 B2 | 3/2006 | Evain et al. |
| 7,022,640 B2 | 4/2006 | Morini et al. |
| 7,049,377 B1 | 5/2006 | Morini et al. |
| 7,202,314 B2 | 4/2007 | Morini et al. |
| 7,208,435 B2 | 4/2007 | Hosaka et al. |
| 7,223,712 B2 | 5/2007 | Morini et al. |
| 7,244,794 B2 | 7/2007 | Park et al. |
| 7,276,463 B2 | 10/2007 | Sugano et al. |
| 7,351,778 B2 | 4/2008 | Gao et al. |
| 7,371,802 B2 | 5/2008 | Gulevich et al. |
| 7,491,781 B2 | 2/2009 | Uhrhammer et al. |
| 7,544,748 B2 | 6/2009 | Gulevich et al. |
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,935,766 B2 | 5/2011 | Sheard et al. |

(Continued)

FOREIGN PATENT DOCUMENTS

WO    2014013401 A1    1/2014

OTHER PUBLICATIONS

PCT Application No. US2015/057690; International Search Report and Written Opinion of the International Searching Authority for Applicant Formosa Plastics Corporation, USA dated Mar. 3, 2016.

*Primary Examiner* — Catherine S Branch

(74) *Attorney, Agent, or Firm* — Jones Walker LLP

(57) ABSTRACT

The present invention relates to the use of oxalic acid diamides as modifiers in conjunction with solid Ziegler-Natta type catalyst in processes in which polyolefins such as polypropylene are produced. The modified catalyst compositions produce polypropylene with good productivity and higher sterospecificity than systems without such modification.

19 Claims, No Drawings

(56) References Cited

U.S. PATENT DOCUMENTS

| | | |
|---|---|---|
| 7,964,678 B2 | 6/2011 | Wang et al. |
| 8,003,558 B2 | 8/2011 | Chang |
| 8,003,559 B2 | 8/2011 | Chang |
| 8,088,872 B2 | 1/2012 | Chen et al. |
| 8,211,819 B2 | 7/2012 | Chang |
| 8,222,357 B2 | 7/2012 | Chen |
| 8,227,370 B2 | 7/2012 | Chang |
| 8,236,908 B2 | 8/2012 | Hirahata et al. |
| 8,247,341 B2 | 8/2012 | Gonzalez et al. |
| 8,247,504 B2 | 8/2012 | Yano et al. |
| 8,263,520 B2 | 9/2012 | Coalter, III et al. |
| 8,263,692 B2 | 9/2012 | Sheard et al. |
| 8,288,304 B2 | 10/2012 | Chen et al. |
| 8,288,585 B2 | 10/2012 | Chen et al. |
| 8,288,606 B2 | 10/2012 | Uhrhammer et al. |
| 8,318,626 B2 | 11/2012 | Chang |
| 8,383,540 B2 | 2/2013 | Chen et al. |
| 8,536,290 B2 | 9/2013 | Chen et al. |
| 8,569,195 B2 | 10/2013 | Chang |
| 8,575,283 B1 | 11/2013 | Fang et al. |
| 8,604,146 B2 | 12/2013 | Chen et al. |
| 8,614,162 B2 | 12/2013 | Coalter, III |
| 8,633,126 B2 | 1/2014 | Coalter, III et al. |
| 8,648,001 B2 | 2/2014 | Hosaka et al. |
| 8,664,142 B2 | 3/2014 | Kim et al. |
| 8,680,222 B2 | 3/2014 | Standaert et al. |
| 8,692,927 B2 | 4/2014 | Pease et al. |
| 8,716,514 B2 | 5/2014 | Ernst et al. |
| 8,742,040 B2 | 6/2014 | Matsunaga et al. |
| 2004/0229748 A1 | 11/2004 | Chen et al. |
| 2006/0116280 A1 | 6/2006 | Yabunouchi et al. |

OXALIC ACID DIAMIDES AS MODIFIERS FOR POLYOLEFIN CATALYSTS

BACKGROUND

1. Field of the Invention

This invention relates to polymerization catalyst systems employing oxalic acid diamides as a modifier, to methods of making such polymerization catalyst systems, and to polymerization processes for producing polyolefins, particularly polypropylene, which exhibits substantially higher sterospecificity than catalyst systems without oxalic acid diamides modification.

2. Description of the Related Art

Ziegler-Natta catalyst systems for polyolefin polymerization are well known in the art. Commonly, these systems are composed of a solid Ziegler-Natta catalyst component and a co-catalyst component, usually an organoaluminum compound. To increase the activity and sterospecificity of the catalyst system for the polymerization of α-olefins, electron donating compounds have been widely used (1) as an internal electron donor in the solid Ziegler-Natta catalyst component, and/or (2) as an external electron donor to be used in conjunction with the solid Ziegler-Natta catalyst component and the co-catalyst component.

In the utilization of Ziegler-Natta type catalysts for polymerizations involving propylene or other olefins for which isotacticity is a possibility, it may be desirable to utilize an external electron donor, which may or may not be in addition to the use of an internal electron donor. Acceptable external electron donors include organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred external electron donors are organosilicon compounds containing Si—O—C and/or Si—N—C bonds, having silicon as the central atom. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,244,794; 7,276,463; 7,619,049; 7,790,819; 8,247,504; 8,648,001; and 8,614,162, which are incorporated by reference herein.

Common internal electron donor compounds, which are incorporated in the solid Ziegler-Natta catalyst component during preparation of such component, are known in the art and include ethers, ketones, amines, alcohols, heterocyclic organic compounds, phenols, phosphines, and silanes. It is well known in the art that polymerization activity, as well as stereoregularity, molecular weight, and molecular weight distribution of the resulting polymer depend on the molecular structure of the internal electron donor employed. Therefore, in order to improve the polymerization process and the properties of the resulting polymer, there has been an effort and desire to develop various internal electron donors. Examples of such internal electron donor compounds and their use as a component of the catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,048,818; 6,121,483; 6,281,301; 6,294,497; 6,313,238; 6,395,670; 6,436,864; 6,605,562; 6,716,939; 6,770,586; 6,818,583; 6,825,309; 7,022,640; 7,049,377; 7,202,314; 7,208,435; 7,223,712; 7,351,778; 7,371,802; 7,491,781; 7,544,748; 7,674,741; 7,674,943; 7,888,437; 7,888,438; 7,935,766; 7,964,678; 8,003,558; 8,003,559; 8,088,872; 8,211,819; 8,222,357; 8,227,370; 8,236,908; 8,247,341; 8,263,520; 8,263,692; 8,288,304; 8,288,585; 8,288,606; 8,318,626; 8,383,540; 8,536,290 8,569,195; 8,575,283; 8,604,146; 8,633,126; 8,692,927; 8,664,142; 8,680,222; 8,716,514 and 8,742,040, which are incorporated by reference herein.

Most commercial propylene polymerization catalysts currently used employ alkyl phthalate esters as an internal electron donor. However, certain environmental issues have been recently raised concerning the continued use of phthalate derivatives in human contact applications. As a result, the employment of a phthalate-free propylene polymerization catalyst or a catalyst system that employs a reduced amount of phthalate is now necessary for the production of polypropylene to remedy these issues.

U.S. Pat. No. 6,323,150 describes the use of a propylene polymerization catalyst which contains a reduced amount of phthalate as an internal electron donor. However, the resulted polypropylene product was found to exhibit low isotacticity and productivity. This prior art also teaches a polymerization catalyst consisting of a polyether compound combined with the phthalate derivative as internal electron donors. The resultant polypropylene product exhibits lower isotacticity than that of a catalyst containing only the phthalate derivative.

U.S. Pat. No. 7,491,781 teaches the use of an internal electron donor in a propylene polymerization catalyst component which does not contain a phthalate derivative. However the resultant propylene polymerization catalyst produced polypropylene with lower isotacticity than that of a catalyst containing a phthalate derivative.

As such, there is still a need for developing catalyst systems that can be used to produce polyolefins, particularly polypropylene, containing a reduced amount of phthalate derivatives as internal electron donors while exhibiting high isotacticity. Even more desirable is the development of a phthalate-free catalyst system capable of producing polypropylene with an isotacticity that is equal to or better than systems that contain only phthalate derivatives.

SUMMARY OF THE INVENTION

The present invention provides a method of modifying a Ziegler-Natta catalyst system which contains a reduced amount of phthalate derivatives as an internal electron donor for propylene polymerization, to yield a polypropylene product with an isotacticity that is better than catalyst systems containing only phthalate derivatives. The present invention also provides a method of modifying a phthalate-free Ziegler-Natta catalyst system and producing polypropylene with an isotacticity that is higher than catalyst systems that are without such modification.

In accordance with various aspects thereof, the present invention relates to a catalyst system for the polymerization or co-polymerization of alpha-olefins comprising a modified solid Ziegler-Natta type catalyst component, a co-catalyst component, and optionally an external electron donor component. The modified solid Ziegler-Natta type catalyst component comprises at least one oxalic acid diamide as a modifier in addition to the internal electron donors typically employed for the polymerization of propylene. Oxalic acid diamides that may be used as modifiers in polymerization catalyst systems of the present invention are represented by Formula I:

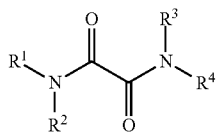

[Formula I]

wherein $R^1$, $R^2$, $R^3$, and $R^4$, which may be identical or different, are independently hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

DESCRIPTION OF PREFERRED EMBODIMENTS

The present invention relates to oxalic acid diamides that may be employed as a modifier for polymerization catalyst systems, to polymerization catalyst systems employing the oxalic acid diamides as a modifier, to methods of making the polymerization catalyst systems, and to polymerization processes to produce polyolefins, particularly polypropylene, which exhibit substantially higher sterospecificity than the systems that were without oxalic acid diamide modification.

In accordance with certain embodiments of the present invention, a class of oxalic acid diamides useful as modifiers in polymerization catalyst systems for the production of polyolefins, particularly polypropylene, are disclosed. These oxalic acid diamides may be used as either an internal modifier or an external modifier. Preferably, these oxalic acid diamides are used as an internal modifier. Polymerization catalyst systems employing oxalic acid diamide modifiers of the present invention may additionally have an internal electron donor, an external electron donor, or both an internal electron donor and an external electron donor.

The oxalic acid diamides of the present invention may be used alone as a single constituent as the modifier component of the catalyst system or may be used in combination with one or more internal electron donors that are typically employed in Ziegler-Natta polypropylene catalyst systems. It is preferred that oxalic acid diamides be used in combination with one or more internal electron donors that are typically employed in Ziegler-Natta polypropylene catalyst system. If more than one modifier is used as the modifier component, one or more of the constituents may be oxalic acid diamides of the present invention.

According to certain aspects of the present invention, the oxalic acid diamides that may be used as modifiers in polymerization catalyst systems are represented by Formula I:

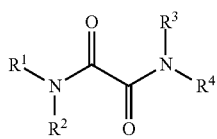

[Formula I]

wherein $R^1$, $R^2$, $R^3$, and $R^4$ may be identical or different, are independently hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

Preferred examples of suitable oxalic acid diamides of the Formula I include, but are not limited to:

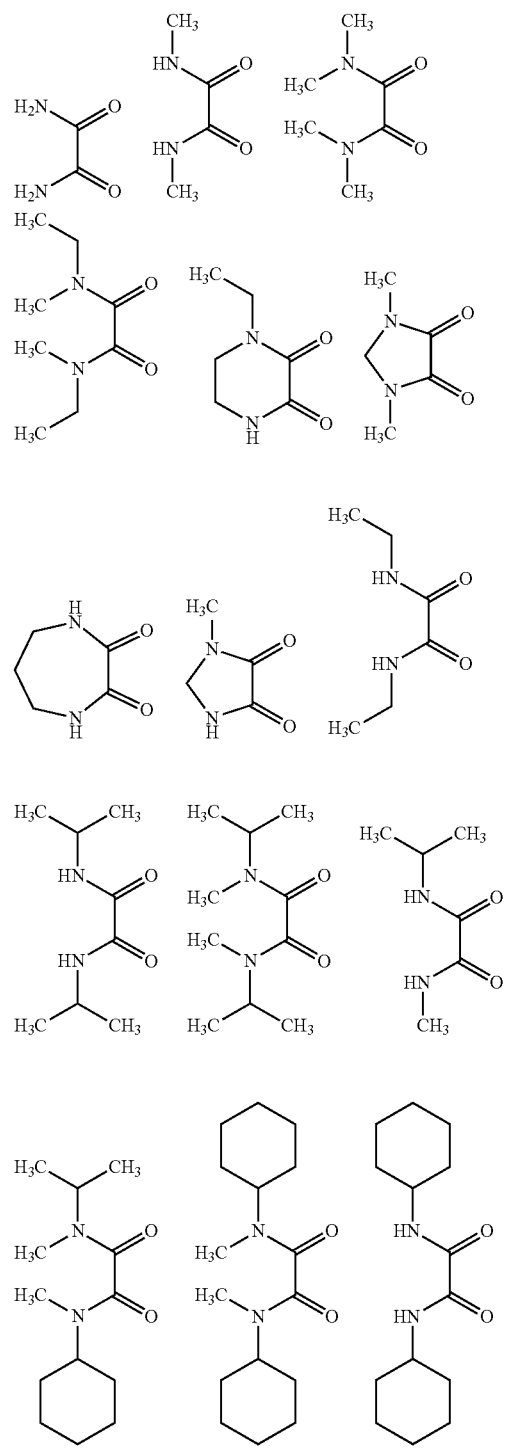

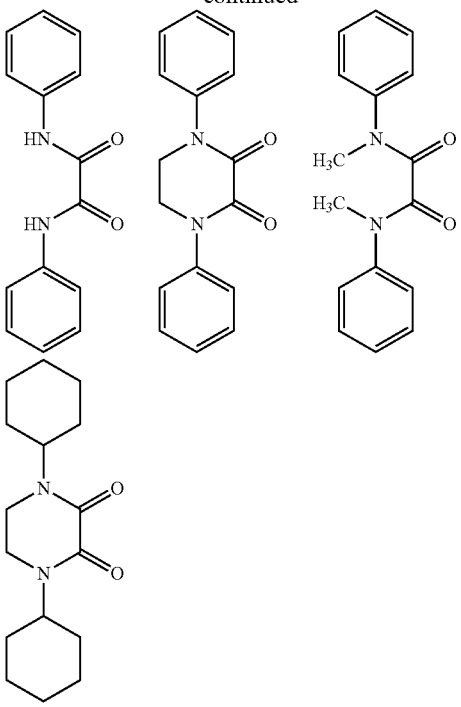

The oxalic acid diamides of the present invention may be used as a component in Ziegler-Natta type catalyst systems. Except for the inclusion of the oxalic acid diamides of the present invention, the Ziegler-Natta type catalyst systems, and methods for making such catalyst systems, which may be employed in accordance with the various embodiments of the present invention, are not generally limited. Typical, and acceptable, Ziegler-Natta type catalyst systems that may be used in accordance with the present invention comprise (a) a solid Ziegler-Natta type catalyst component, (b) a co-catalyst component, and optionally (c) one or more external electron donors. In accordance with certain embodiments of the present invention, at least one oxalic acid diamide is used as a modifier in addition to the internal electron donor typically employed in the Ziegler-Natta type catalyst system. As previously disclosed herein, these oxalic acid diamides may be used as either an internal modifier or an external modifier. Preferably, these oxalic acid diamides are used as an internal modifier.

Preferred solid Ziegler-Natta type catalyst component (a) include solid catalyst components comprising a titanium compound having at least a Ti-halogen bond and an internal electron donor compound supported on an anhydrous magnesium-dihalide support. Such preferred solid Ziegler-Natta type catalyst component (a) include solid catalyst components comprising a titanium tetrahalide. A preferred titanium tetrahalide is $TiCl_4$. Alkoxy halides may also be used solid Ziegler-Natta type catalyst component (a).

If the oxalic acid diamides of the present invention are used in combination with one or more internal electron donor component of the catalyst system, the acceptable additional internal electron donor compounds for the preparation of solid Ziegler-Natta type catalyst component (a) are not generally limited and include, but are not limited to, alkyl, aryl, and cycloalkyl esters of aromatic acids, in particular the alkyl esters of benzoic acid and phthalic acid and their derivatives. Examples of such compounds include ethyl benzoate, n-butyl benzoate, methyl-p-toluate, and methyl-p-methoxybenzoate and diisobutylphthalate. Other common internal electron donors, including alkyl or alkyl-aryl ethers, polyethers, ketones, mono- or polyamines, heterocyclic organic compounds, aldehydes, and P-compounds, such as phosphines and phosphoramides, may also be used.

Acceptable anhydrous magnesium dihalides forming the support of the solid Ziegler-Natta type catalyst component (a) are the magnesium dihalides in active form that are well known in the art. Such magnesium dihalides may be preactivated, may be activated in situ during the titanation, may be formed in-situ from a magnesium compound, which is capable of forming magnesium dihalide when treated with a suitable halogen-containing transition metal compound, and then activated. Preferred magnesium dihalides are magnesium dichloride and magnesium dibromide. The water content of the dihalides is generally less than 1% by weight.

The solid Ziegler-Natta type catalyst component (a) may be made by various methods. One such method consists of co-grinding the magnesium dihalide and the internal electron donor compound until the product shows a surface area higher than 20 $m^2/g$ and thereafter reacting the ground product with the Ti compound. Other methods of preparing solid Ziegler-Natta type catalyst component (a) are disclosed in U.S. Pat. Nos. 4,220,554; 4,294,721; 4,315,835; 4,330,649; 4,439,540; 4,816,433; and 4,978,648. These methods are incorporated herein by reference.

In a typical modified solid Ziegler-Natta type catalyst component (a), the molar ratio between the magnesium dihalide and the halogenated titanium compound is between 1 and 500, the molar ratio between said halogenated titanium compound and the internal electron donor is between 0.1 and 50, and the molar ratio between said internal electron donor and the oxalic acid diamide modifier is between 0.1 and 100.

Preferred co-catalyst component (b) includes aluminum alkyl compounds. Acceptable aluminum alkyl compounds include aluminum trialkyls, such as aluminum triethyl, aluminum triisobutyl, and aluminum triisopropyl. Other acceptable aluminum alkyl compounds include aluminum-dialkyl hydrides, such as aluminum-diethyl hydrides. Other acceptable co-catalyst component (b) include compounds containing two or more aluminum atoms linked to each other through hetero-atoms, such as:

$(C_2H_5)_2Al$—O—$Al(C_2H_5)_2$
$(C_2H_5)_2Al$—$N(C_6H_5)$—$Al(C_2H_5)_2$; and
$(C_2H_5)_2Al$—O—$SO_2$—O—$Al(C_2H_5)_2$.

Acceptable external electron donor component (c) is organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred component (c) is organosilicon compounds containing Si—O—C and/or Si—N—C bonds. Special examples of such organosilicon compounds are trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2methoxy-[1,3,2]oxazasilolidine, 3-tert-Butyl-2-cyclopentyl-2-methoxy-[1,3,2]oxazasilolidine, 2-Bicyclo[2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-sila-spiro[4.4]nonane, bis(perhydroisoquinolino)dimethoxysilane, etc. Mixtures of organic electron donors may also be used. Finally, the oxalic acid diamides of the present invention may also be employed as an external electronic donor.

The olefin polymerization processes that may be used in accordance with the present invention are not generally limited. For example, the catalyst components (a), (b) and (c), when employed, may be added to the polymerization reactor simultaneously or sequentially. It is preferred to mix components (b) and (c) first and then contact the resultant mixture with component (a) prior to the polymerization.

The olefin monomer may be added prior to, with, or after the addition of the Ziegler-Natta type catalyst system to the polymerization reactor. It is preferred to add the olefin monomer after the addition of the Ziegler-Natta type catalyst system.

The molecular weight of the polymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate.

The polymerization reactions may be carried out in slurry, liquid or gas phase processes, or in a combination of liquid and gas phase processes using separate reactors, all of which may be done either by batch or continuously. The polyolefin may be directly obtained from gas phase process, or obtained by isolation and recovery of solvent from the slurry process, according to conventionally known methods.

There are no particular restrictions on the polymerization conditions for production of polyolefins by the method of this invention, such as the polymerization temperature, polymerization time, polymerization pressure, monomer concentration, etc. The polymerization temperature is generally from 40-90° C. and the polymerization pressure is generally 1 atmosphere or higher.

The Ziegler-Natta type catalyst systems of the present invention may be precontacted with small quantities of olefin monomer, well known in the art as prepolymerization, in a hydrocarbon solvent at a temperature of 60° C. or lower for a time sufficient to produce a quantity of polymer from 0.5 to 3 times the weight of the catalyst. If such a prepolymerization is done in liquid or gaseous monomer, the quantity of resultant polymer is generally up to 1000 times the catalyst weight.

The Ziegler-Natta type catalyst systems of the present invention are useful in the polymerization of olefins, including but not limited to homopolymerization and copolymerization of alpha olefins. Suitable α-olefins that may be used in a polymerization process in accordance with the present invention include olefins of the general formula $CH_2=CHR$, where R is H or $C_{1-10}$ straight or branched alkyl, such as ethylene, propylene, butene-1, pentene-1, 4-methylpentene-1 and octene-1. While the Ziegler-Natta type catalyst systems of the present invention may be employed in processes in which ethylene is polymerized, it is more desirable to employ the Ziegler-Natta type catalyst systems of the present invention in processes in which polypropylene or higher olefins are polymerized. Processes involving the homopolymerization or copolymerization of propylene are preferred.

EXAMPLES

In order to provide a better understanding of the foregoing, the following non-limiting examples are offered. Although the examples may be directed to specific embodiments, they are not to be viewed as limiting the invention in any specific respect. The activity values (AC) are based upon grams of polymer produced per gram of solid catalyst component used.

The following analytical methods are used to characterize the polymer.

Heptane Insolubles (% HI): The weight percent (wt %) of residuals of polypropylene sample after extracted with boiling heptane for 8 hours.

Melt Flow rate (MI): ASTM D-1238, determined at 230° C. under the load of 2.16 kg.

$T_m$: ASTM D-3417, determined by DSC (Manufacturer: TA Instrument, Inc; Model: DSC Q1000).

Determination of Isotactic Pentads Content: Place 400 mg of polymer sample into 10 mm NMR tube. 1.7 g TCE-d2 and 1.7 g o-DCB were added into the tube. $^{13}C$ NMR spectra were acquired on a Bruker AVANCE 400 NMR (100.61 MHz, 90° pulse, 12 s delay between pulse). About 5000 transients were stored for each spectrum; mmmm pentad peak (21.09 ppm) was used as reference. The microstructure analysis was carried out as described in literature (Macromolecules, 1994, 27, 4521-4524, by V. Busico, et al.).

Molecular weight (Mn and Mw): The weight average molecular weight (Mw), number average molecular weight (Mn), and molecular weight distribution (Mw/Mn) of polymers were obtained by gel permeation chromatography on Water 2000GPCV system using Polymer Labs Plgel 10 um MIXED-B LS 300×7.5 mm columns and 1,2,4-trichlorobenzene (TCB) as mobile phase. The mobile phase was set at 0.9 ml/min, and temperature was set at 145° C. Polymer samples were heated at 150° C. for two hours. Injection volume was 200 microliters. External standard calibration of polystyrene standards was used to calculate the molecular weight.

Specimens for the physical property tests were injection molded according to the conditions specified in ASTM D-4101.

Flexural Modulus (1.3 mm/min), 1% Secant: ASTM D-790
Tensile Strength at yield (50 mm/min): ASTM D-638
Tensile Strength at break (50 mm/min): ASTM D-638
Elongation at yield (50 mm/min): ASTM D-638
Notched IZOD Impact strength @73° F.: ASTM D-256
Rockwell Hardness: ASTM D-785

Magnesium ethoxide (98%), anhydrous toluene (99.8%), $TiCl_4$ (99.9%), anhydrous n-heptane (99%), diisobutyl phthalate (99%), cyclohexyl(dimethoxy)methylsilane (C-donor, ≥99%) and triethylaluminum (93%) were all purchased from Sigma-Aldrich Co. of Milwaukee, Wis., USA.

Diisopropyldimethoxysilane (P-donor) and dicyclopentyldimethoxysilane (D-donor) were purchased from Gelest, Inc. of Morrisville, Pa., USA.

Diethyldiisobutylmalonate (98%) and 1-ethyl-2,3-piperazinedione (used as Modifier, 98%) were purchase from TCI America.

Diether catalyst was purchased from a commercial source.

Unless otherwise indicated, all reactions were conducted under an inert atmosphere.

Example 1

(A) the Preparation of a Solid Catalyst Component

A 250 ml flask equipped with a stirrer and thoroughly purged with nitrogen was charged with 80 mmol of magnesium ethoxide and 80 ml of anhydrous toluene to form a suspension. To the suspension was injected 20 ml of $TiCl_4$ and was then heated up to a temperature of 90° C. 7.0 mmol of diisobutyl phthalate (DIBP) as internal electron donor and 3.0 mmol of 1-ethyl-2,3-piperazinedione as modifier were added thereto, followed by heating up to 110° C. with agitation at that temperature for 2 hours. After the completion of the reaction, the product was washed twice with 100 ml of anhydrous toluene at 90° C., and 80 ml of fresh anhydrous toluene and 20 ml of $TiCl_4$ were added thereto for reacting with agitation at 110° C. for two additional hours. After the completion of the reaction, the product was washed 8 times with 100 ml of anhydrous n-heptane at 90° C. and was dried under a reduced pressure to obtain a solid composition.

(B) Polymerization

Propylene polymerization was conducted in a bench scale 2-liter reactor per the following procedure.

The reactor was first preheated to at least 100° C. with a nitrogen purge to remove residual moisture and oxygen. The reactor was thereafter cooled to 50° C. Under nitrogen, 1 liter dry heptane was introduced into the reactor. When reactor temperature was about 50° C., 4.3 ml of triethylaluminum (0.58M, in hexanes), 1.0-1.6 ml of dicyclopentyl (dimethoxy)silane (D-donor) (0.5 M in heptane) or 1.0-1.6 ml of diisopropyl(dimethoxy)silane (P-donor) (0.5 M in heptane), and then 30 mg of the solid catalyst component prepared above were added to the reactor. The temperature of the reactor was heated to 50° C. and 8 psi hydrogen in a 150 ml vessel was flushed into the reactor with propylene.

The reactor temperature was then raised to 70° C. The total reactor pressure was raised to and controlled at 90 psig by continually introducing propylene into the reactor and the polymerization was allowed to proceed for 1 hour. After polymerization, the reactor was vented to reduce the pressure to 0 psig and the reactor temperature was cooled to 50° C.

The reactor was then opened. 500 ml methanol was added to the reactor and the resulting mixture was stirred for 5 minutes then filtered to obtain the polymer product. The obtained polymer was vacuum dried at 80° C. for 6 hours. The polymer was evaluated for melt flow rate (MFR), heptane insoluble (% HI), and melting point ($T_m$). The activity of catalyst (AC) was also measured. The results are shown in TABLE 1.

Example 2

A 250 ml flask equipped with a stirrer and thoroughly purged with nitrogen was charged with 80 mmol of magnesium ethoxide, 3.0 mmol of 1-ethyl-2,3-piperazinedione as modifier and 80 ml of anhydrous toluene to form a suspension. To the suspension was injected 20 ml of $TiCl_4$ and was then heated up to a temperature of 90° C. 7.0 mmol of diisobutyl phthalate (DIBP) as internal electron donor was added thereto, followed by heating up to 110° C. with agitation at that temperature for 2 hours. After the completion of the reaction, the product was washed twice with 100 ml of anhydrous toluene at 90° C., and 80 ml of fresh anhydrous toluene and 20 ml of $TiCl_4$ were added thereto for reacting with agitation at 110° C. for two additional hours. After the completion of the reaction, the product was washed 8 times with 100 ml of anhydrous n-heptane at 90° C. and was dried under a reduced pressure to obtain a solid composition.

Propylene polymerization was carried out in the same manner as described in Example 1. The results are shown in TABLE 1.

Example 3

A solid catalyst component was prepared in the same manner as in Example 2, except that 2.5 mmol of 1-ethyl-2,3-piperazinedione and 7.5 mmol of DIBP were used instead of 3.0 mmol of 1-ethyl-2,3-piperazinedione and 7.0 mmol of DIBP.

Propylene polymerization was carried out in the same manner as described in Example 1. The results are shown in TABLE 1.

Example 4

A solid catalyst component was prepared in the same manner as in Example 2, except that 1.5 mmol of 1-ethyl-2,3-piperazinedione and 8.5 mmol of DIBP were used instead of 3.0 mmol of 1-ethyl-2,3-piperazinedione and 7.0 mmol of DIBP.

Propylene polymerization was carried out in the same manner as described in Example 1. The results are shown in TABLE 1.

Example 5

A solid catalyst component was prepared in the same manner as in Example 1, except that 4.0 mmol of DIBP and 4.0 mmol of 1-ethyl-2,3-piperazinedione were used instead of 7.0 mmol of DIBP and 3.0 mmol of 1-ethyl-2,3-piperazinedione.

Propylene polymerization was carried out in the same manner as described in Example 1. The results are shown in TABLE 1.

Example 6

A solid catalyst component was prepared in the same manner as in Example 1, except that 2.0 mmol of DIBP and 6.0 mmol of 1-ethyl-2,3-piperazinedione were used instead of 8.5 mmol of DIBP and 1.5 mmol of 1-ethyl-2,3-piperazinedione.

Propylene polymerization was carried out in the same manner as described in Example 1. The results are shown in TABLE 1.

Example 7

A solid catalyst component was prepared in the same manner as in Example 1, except that 4.0 mmol of 1-ethyl-2,3-piperazinedione and 8.0 mmol of Diethyl diisobutylmalonate (DEDIBM) were used instead of 3.0 mmol of 1-ethyl-2,3-piperazinedione and 7.0 mmol of DIBP.

Propylene polymerization was carried out in the same manner as described in Example 1. The results are shown in TABLE 1.

Example 8

A 250 ml flask equipped with a stirrer and thoroughly purged with nitrogen was charged with 4.0 g of commercial solid catalyst containing 1-5 wt % of diether as internal electron donor, which was used for Comparative Example 6, and 60 ml of toluene. To the slurry composition above, 2.0 mmol of 1-ethyl-2,3-piperazinedione as modifier was added with 80 ml toluene, and 20 ml TiCl$_4$ was charged. The slurry mixture was heated to 110° C. and stirred for 2 hour. After the completion of the reaction, the product was washed 8 times with 100 ml of anhydrous n-heptane at 40° C. and was dried under a reduced pressure to obtain a solid composition.

Propylene polymerization was carried out in the same manner as described in Example 1. The results are shown in TABLE 1

Example 9

A solid catalyst component was prepared in the same manner as in Example 8, except that 4.0 mmol of 1-ethyl-2,3-piperazinedione was used instead 2.0 mmol of 1-ethyl-2,3-piperazinedione.

Propylene polymerization was carried out in the same manner as described in Example 1. The results are shown in TABLE 1.

Comparative Example 1 (C1)

Catalyst Preparation

A 250 ml flask equipped with a stirrer and thoroughly purged with nitrogen was charged with 80 mmol of magnesium ethoxide and 80 ml of anhydrous toluene to form a suspension. To the suspension was injected 20 ml of TiCl$_4$ and was then heated up to a temperature of 90° C. 10.0 mmol of diisobutyl phthalate (DIBP) as internal electron donor was added thereto, followed by heating up to 110° C. with agitation at that temperature for 2 hours. After the completion of the reaction, the product was washed twice with 100 ml of anhydrous toluene at 90° C., and 80 ml of fresh anhydrous toluene and 20 ml of TiCl$_4$ were added thereto for reacting with agitation at 110° C. for two additional hours. After the completion of the reaction, the product was washed 8 times with 100 ml of anhydrous n-heptane at 90° C. and was dried under a reduced pressure to obtain a solid composition.

Propylene polymerization was carried out in the same manner as described in Example 1. The results are shown in TABLE 1.

Comparative Example 2 (C2)

A solid catalyst was prepared in the same manner as in Comparative Example 1, except that 7.0 mmol of DIBP were used instead of 10.0 mmol of DIBP.

Comparative Example 3 (C3)

A solid catalyst was prepared in the same manner as in Comparative Example 1, except that 4.0 mmol of DIBP were used instead of 10.0 mmol of DIBP.

Propylene polymerization was carried out in the same manner as described in Example 1. The results are shown in TABLE 1.

Comparative Example 4 (C4)

A solid catalyst was prepared in the same manner as in Comparative Example 1, except that 2.0 mmol of DIBP were used instead of 10.0 mmol of DIBP.

Propylene polymerization was carried out in the same manner as described in Example 1. The results are shown in TABLE 1.

Comparative Example 5 (C5)

A solid catalyst component was prepared in the same manner as in Comparative Example 1, except that 8.0 mmol of Diethyl diisobutylmalonate (DEDIBM) as internal electron donor was used instead of 10.0 mmol of DIBP.

Propylene polymerization was carried out in the same manner as described in Example 1. The results are shown in TABLE 1.

Comparative Example 6 (C6)

For Comparative Example 6, a commercial diether catalyst which was employed to prepare Examples 8 and 9 was used as received.

Propylene polymerization was carried out in the same manner as described in Example 1. The results are shown in TABLE 1.

TABLE 1

| Run No. | Catalyst Example | Internal Donor (mmol) | Modifier* (mmol) | Ext. Donor (mmol) | Activity (g/g cat.) | HI (%) | Mmmm (%) | MFR (g/10 min) | T$_m$ (° C.) |
|---|---|---|---|---|---|---|---|---|---|
| 1 | 1 | DIBP (7.0) | 3.0 | P (0.8) | 4014 | 99.4 | | 1.4 | |
| 2 | 1 | DIBP (7.0) | 3.0 | D (0.8) | 4244 | 99.5 | 97.6 | 1.1 | 164.0 |
| 3 | 2 | DIBP (7.0) | 3.0 | P (0.8) | 4607 | 99.4 | | 1.9 | |
| 4 | 2 | DIBP (7.0) | 3.0 | D (0.8) | 4620 | 99.5 | | 1.3 | 165.4 |
| 5 | 3 | DIBP (7.5) | 2.5 | P (0.8) | 4170 | 99.6 | | 1.7 | |
| 6 | 3 | DIBP (7.5) | 2.5 | D (0.8) | 4834 | 99.6 | | 1.1 | 164.8 |
| 7 | 4 | DIBP (8.5) | 1.5 | P (0.8) | 5137 | 99.5 | | 1.9 | |
| 8 | 4 | DIBP (8.5) | 1.5 | D (0.8) | 5827 | 99.6 | 98.3 | 0.8 | 165.0 |
| 9 | 5 | DIBP (4.0) | 4.0 | P (0.5) | 2824 | 98.2 | | 4.6 | |
| 10 | 5 | DIBP (4.0) | 4.0 | D (0.5) | 2224 | 98.1 | | 4.7 | |
| 11 | 6 | DIBP (2.0) | 6.0 | P (0.5) | 2678 | 97.7 | | 5.7 | |
| 12 | 6 | DIBP (2.0) | 6.0 | D (0.5) | 2188 | 97.9 | | 4.6 | |
| 13 | C1 | DIBP (10.0) | 0.0 | P (0.8) | 5927 | 99.3 | | 2.1 | |
| 14 | C1 | DIBP (10.0) | 0.0 | P (0.8) | 5844 | 99.3 | 97.3 | 1.3 | 163.3 |
| 15 | C2 | DIBP (7.0) | 0.0 | P (0.8) | 5307 | 99.1 | | 3.4 | |
| 16 | C2 | DIBP (7.0) | 0.0 | D (0.8) | 4350 | 98.9 | 96.8 | 1.9 | 162.8 |
| 17 | C3 | DIBP (4.0) | 0.0 | P (0.5) | 2692 | 97.0 | | 5.2 | |
| 18 | C3 | DIBP (4.0) | 0.0 | D (0.5) | 2374 | 96.7 | | 6.6 | |
| 19 | C4 | DIBP (2.0) | 0.0 | P (0.5) | 2313 | 93.8 | | 5.3 | |
| 20 | C4 | DIBP (2.0) | 0.0 | D (0.5) | 2074 | 94.4 | | 6.2 | |
| 21 | 7 | DEDIBM (8.0) | 4.0 | P (0.5) | 2696 | 98.0 | | 6.4 | 161.8 |

TABLE 1-continued

| Run No. | Catalyst Example | Internal Donor (mmol) | Modifier* (mmol) | Ext. Donor (mmol) | Activity (g/g cat.) | HI (%) | Mmmm (%) | MFR (g/10 min) | $T_m$ (° C.) |
|---|---|---|---|---|---|---|---|---|---|
| 22 | 7 | DEDIBM (8.0) | 4.0 | D (0.5) | 2524 | 98.2 | | 6.1 | |
| 23 | C5 | DEDIBM (8.0) | 0.0 | P (0.5) | 2620 | 96.6 | | 6.9 | 160.3 |
| 24 | C5 | DEDIBM (8.0) | 0.0 | D (0.5) | 2390 | 97.3 | | 5.5 | |
| 25 | 8 | Diether | 2.0 | P (0.5) | 4247 | 99.1 | | 5.9 | 162.7 |
| 26 | 8 | Diether | 2.0 | C (0.5) | 4440 | 99.0 | | 5.5 | 163.2 |
| 27 | 8 | Diether | 2.0 | None | 5450 | 98.1 | 95.7 | 6.0 | 161.9 |
| 28 | 9 | Diether | 4.0 | C (0.5) | 4056 | 99.2 | | 6.1 | 163.5 |
| 29 | 9 | Diether | 4.0 | None | 5383 | 98.3 | | 6.1 | 161.5 |
| 30 | C6 | Diether | 0.0 | P (0.5) | 3890 | 98.8 | | 6.0 | 163.0 |
| 31 | C6 | Diether | 0.0 | C (0.5) | 3783 | 98.7 | | 5.0 | 162.6 |
| 32 | C6 | Diether | 0.0 | None | 5566 | 96.9 | 94.6 | 5.1 | 160.9 |

*Modifier: 1-ethyl-2,3-piperazinedione

As shown from the above results, the employment of 1-ethyl-2,3-piperazinedione as a modifier in the present inventive catalyst systems produce polypropylene with an isotacticity higher than the systems that contain only phthalate derivatives. For example, for a given loading of 7.0 mmol of DIBP, the modified system (Run No. 2) produced PP with a % HI of 99.5 while that by the DIBP-only system (Run No. 16) exhibited a % HI of 98.9. Such an enhancement of isotacticity becomes even more substantial with the systems that contain reduced amount of phthalate. For example, for a given loading of 2.0 mmol of DIBP, the modified system (Run No. 12) produced PP with a % HI of 97.9 while that by the DIBP-only system (Run No. 20) exhibited a % HI of 94.4. The employment of 1-ethyl-2,3-piperazinedione as a modifier in the present inventive catalyst systems also produces polypropylene with an isotacticity that is higher than the phthalate-free systems that employ only malonates or diethers as the internal electron donors. For example, for a given loading of 8.0 mmol of DEDIBM, the modified system (Run No. 21) exhibited a % HI of 98.0 while that of the unmodified system produced PP with a % HI of 96.6 (Run No. 23). In the case of 1,3-Diether, the modified system (Run No. 27), under a given condition, produced PP with a % HI of 98.1, while that of the 1,3-diether-only system (Run No. 32) exhibited a % HI of 96.9.

Example 10

(A) the Preparation of a Solid Catalyst Component

In Example 10, the modified PP catalyst as described in Experiment 4 was prepared and employed for bulk propylene polymerization per the procedure below. Eight identical runs were conducted and about 9 lbs of sample were collected for the property study. The polymer powder obtained was divided into two parts and were admixed with the additive mixture per specification in TABLE 2, where B215, NaBz and DHT4V were purchased from Songwan, Malicrodt and Kisuma respectively. The physical property data were summarized in TABLE 2.

(B) Bulk-Phase Polymerization

Bulk-phase polymerization was conducted in a 1-gallon reactor. The reactor was purged with nitrogen at 90° C. for 1 hour and then cooled down to 20° C. The reactor was vacuumed to remove nitrogen. Then 1.7 liter propylene, 300 psi hydrogen (in a 150-ml vessel), 13.8 ml triethyl aluminum hexane solution (0.629M) and 0.5 ml external donor D in heptane solution (0.5M) were fed into the 1-Gallon reactor. Stirring was started. Then, the temperature was raised to 70° C. and stabilized for a period of 5 minutes. Thereafter, 15 mg catalyst in a tube connected to the reactor was flushed into the reactor with 0.3 liter liquid propylene. The polymerization was run at this temperature for 1 hour. After polymerization, unreacted propylene was vented out, and the temperature of the reactor was lowered to room temperature. The obtained polymer was dried under vacuum at 80° C. for 6 hours. The polymer was weighed and tested with melt flow rate (MFR) and heptane insoluble (% HI).

Comparative Example 7 (C7)

Comparative Example 7 was carried out in bulk propylene polymerization in the same manner as Example 10 except the PP catalyst as described in Comparative Example 1 (C1) was used instead of catalyst Example 4. Eight identical runs were conducted and about 9 lbs of sample were collected. The polymer powder obtained was divided into two parts and were admixed with the additive mixture as described in Example 10. The property testing and the results were summarized in TABLE 2.

TABLE 2

| Example No. | 10 | 10a | C7 | C7a |
|---|---|---|---|---|
| Modifier | 1-ethyl-2,3-piperazinedione | 1-ethyl-2,3-piperazinedione | — | — |
| Activity (gPP/gCat) | 37042 | | 38934 | |
| MI(g/10 min.) | 7.3 | 7.3 | 8.1 | 7.0 |
| % HI | 97.9 | | 97.4 | |
| Mw/Mn | 4.9 | 4.6 | 4.8 | 4.6 |
| B215 (ppm) | 1500 | 1500 | 1500 | 1500 |
| NaBz (ppm) | 0 | 2000 | 0 | 2000 |
| DHT4V(ppm) | 300 | 300 | 300 | 300 |
| Flex Modulus (Kpsi) | 261.7 | 279.0 | 240.3 | 261.5 |
| Tensile Strength at yield (psi) | 5628 | 5888 | 5463 | 5713 |
| Tensile Strength at break (psi) | 4238 | 4876 | 3103 | 4181 |
| IZOD Impact strength (ft ib/in) | 0.7 | 0.5 | 0.7 | 0.8 |
| Elogation @Yield (%) | 7 | 7 | 8 | 7 |
| Rockwell Hardness (N/mm$^2$) | 110.5 | 107.1 | 105.4 | 105.3 |
| Tm (° C.) | 166.2 | 167 | 165.2 | 166.8 |

As shown from the above results, the employment of 1-ethyl-2,3-piperazinedione as a modifier in the present inventive catalyst systems produced polypropylene in a bulk polymerization reactor with Flex Modulus, Tensile Strength at yield, Tensile Strength at break and Rockwell Hard all higher than the systems that without the modification. For examples, the modified systems of Example 10 and Example 10a all exhibited a higher Flex Modulus, 261.7 and 279.0 kpsi respectively, than the corresponding values of 240.3 and 261.5 kpsi by the unmodified systems (C7 and C7a).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A solid catalyst component for the polymerization or co-polymerization of alpha-olefins comprising: titanium, magnesium, halogen, an internal electron donor, and at least one modifier selected from oxalic acid diamides of the formula:

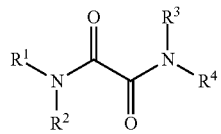

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

2. The solid catalyst component of claim 1, wherein two or more of $R^1$, $R^2$, $R^3$, and $R^4$ may be linked to form one or more saturated or unsaturated monocyclic or polycyclic rings.

3. The solid catalyst component according to claim 1, wherein the internal electron donor is a phthalate compound represented by formula:

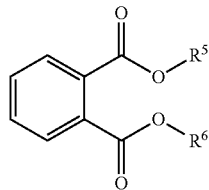

wherein $R^5$ and $R^6$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

4. The solid catalyst component according to claim 3, wherein $R^5$ and $R^6$ may be linked to form one or more saturated or unsaturated monocyclic or polycyclic rings.

5. The solid catalyst component according to claim 1, wherein the internal electron donor is a malonate compound represented by formula:

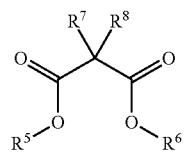

wherein $R^5$ $R^6$, $R^7$, and $R^8$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

6. The solid catalyst component according to claim 5, wherein two or more of $R^5$, $R^6$, $R^7$, and $R^8$ may be linked to form one or more saturated or unsaturated monocyclic or polycyclic rings.

7. The solid catalyst component according to claim 1, wherein the internal electron donor is a diether compound represented by the formula:

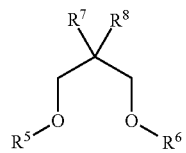

wherein $R^5$ $R^6$, $R^7$, and $R^8$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

8. The solid catalyst component according to claim 7, wherein, wherein two or more of $R^5$, $R^6$, $R^7$, and $R^8$ may be linked to form one or more saturated or unsaturated monocyclic or polycyclic rings.

9. A catalyst system for the polymerization or co-polymerization of alpha-olefins comprising:
(A) a solid catalyst component for the polymerization or co-polymerization of alpha-olefins comprising titanium, magnesium, halogen, an internal electron donor, and at least one modifier selected from oxalic acid diamides of the formula:

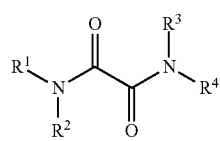

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms; and (B) a co-catalyst component.

10. The solid catalyst component of claim 9, wherein two or more of $R^1$, $R^2$, $R^3$, and $R^4$ may be linked to form one or more saturated or unsaturated monocyclic or polycyclic rings.

11. The catalyst system of claim 9, further comprising one or more external electron donor components.

12. The solid catalyst component according to claim 9, wherein the internal electron donor is a phthalate compound represented by formula:

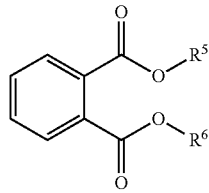

wherein $R^5$ and $R^6$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

13. The solid catalyst component according to claim 12, wherein $R^5$ and $R^6$ may be linked to form one or more saturated or unsaturated monocyclic or polycyclic rings.

14. The solid catalyst component according to claim 9, wherein the internal electron donor is a malonate compound represented by formula:

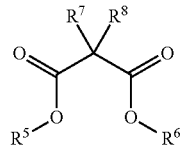

wherein $R^5$ $R^6$, $R^7$, and $R^8$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

15. The solid catalyst component according to claim 14, wherein two or more of $R^5$, $R^6$, $R^7$, and $R^8$ may be linked to form one or more saturated or unsaturated monocyclic or polycyclic rings.

16. The solid catalyst component according to claim 1, wherein the internal electron donor is a diether compound represented by the formula:

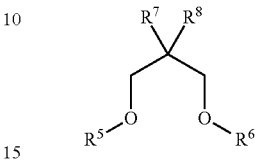

wherein $R^5$ $R^6$, $R^7$, and $R^8$ are independently selected from an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms.

17. The solid catalyst component according to claim 15, wherein, wherein two or more of $R^5$, $R^6$, $R^7$, and $R^8$ may be linked to form one or more saturated or unsaturated monocyclic or polycyclic rings.

18. A method for polymerizing alpha-olefins, comprising: polymerizing alpha-olefins in the presence of:

(A) a solid catalyst component for the polymerization or co-polymerization of alpha-olefin comprising titanium, magnesium, halogen, an internal electron donor, and at least one modifier selected from oxalic acid diamides of the formula:

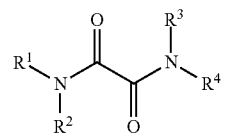

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms; and (B) a co-catalyst component.

19. The method of claim 18, further comprising one or more external electron donor components.

* * * * *